G. BORDEN, Jr.
Vacuum Pan.
No. 35,919.
Patented July 22, 1862.
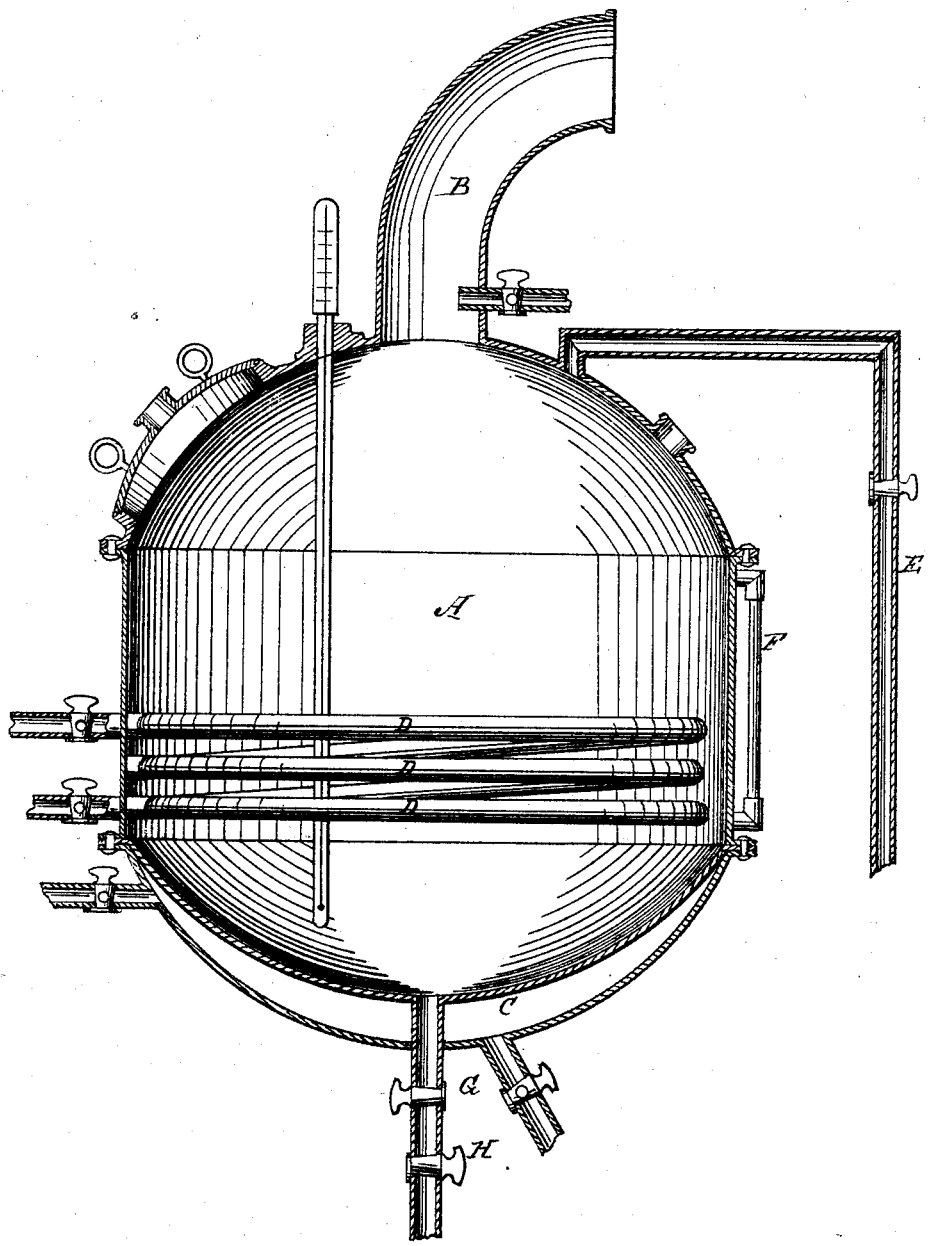
Witnesses:
Elwin H. Jacob
I. L. Cobbs
Inventor:
Gail Borden Jr.
By
Mason, Fenwick & Lawrence
Attys.

UNITED STATES PATENT OFFICE.

GAIL BORDEN, JR., OF AMENIA, NEW YORK.

IMPROVEMENT IN CONCENTRATING AND PRESERVING FOR USE CIDER AND OTHER JUICES OF FRUITS.

Specification forming part of Letters Patent No. 35,919, dated July 22, 1862.

*To all whom it may concern:*

Be it known that I, GAIL BORDEN, Jr., of Amenia, in the county of Dutchess and State of New York, have invented a new article of manufacture and merchandise, consisting of cider concentrated to a jelly, or at least to such a degree that it will not be liable to fermentation or injury when placed in ordinary casks and exposed for any reasonable length of time to the heat of the climate in any latitude; and I do hereby declare that the following is a full and exact description thereof.

It is well known that fermentation commences in new cider very soon after being expressed from the apple and becomes acid and soon unfit for a beverage; that in its natural state it is bulky in proportion to its value, liable to waste and deterioration, rendering it expensive and inconvenient to transport to any great distance, and thereby prevents it from becoming to any considerable extent an article of commerce. The tendency of cider to become acid has sometimes been counteracted by the introduction of foreign substances to prevent fermentation, and sometimes by placing the cider, when sufficiently fermented, in glass bottles, closed or corked, to prevent the contact of air. The former of these methods renders the cider less pure and wholesome. The latter is troublesome and expensive. To obviate these difficulties I adopt means to keep cider from fermentation by concentrating it out of contact with the atmosphere as soon as possible after it is expressed from the apple to such a degree that it will not ferment when exposed to the atmosphere in any climate or in any length of time. In order to avoid the action of the atmosphere upon the cider while boiling, I concentrate it *in vacuo*. One means of doing this will be seen by reference to the drawing, which represents the vacuum-pan used by me in the concentration of sweet milk in the manner patented by me in August, 1856, and for which I have recently obtained a reissue patent, in which—

A represents a vacuum-pan; B, a pipe leading from pan to the condenser and air pumps; C, steam-jacket; D, a coil-pipe for steam; E, an induction-pipe for bringing in fresh cider; F, a glass gage, the better to regulate the quantity of cider in the pan; G and H, cocks to test degree of concentration.

Other forms for a vacuum-pan may be adopted for concentrating cider, the operation of which may be conducted in a similar manner to concentrating sirup or milk. The vacuum-pan should always be kept bright and clean, if copper, to prevent deleterious effects resulting from the action of acid in the cider upon it when oxidized. I prefer that it should be tinned or coated with some substance upon which the cider will not act, or, if it does act, will not produce a hurtful chemical result. The cider may be reduced to such a degree of concentration as may be desired. I have usually reduced it to one-sixth of its original bulk; but its tendency to ferment ceases long before it reaches that degree of concentration. When concentrated, the article is similar in appearance to sugar-house sirup, and frequently with or without further heating forms a jelly, but in either state will be found proof against all influences of climate or exposure. The cider being sufficiently concentrated may be placed in common wooden casks or other vessels and transferred to any part of the world, requiring no more care than a barrel of pork or flour and not so liable to injure or deteriorate by the influence of climate as either of those commodities. The cost of transportation is so far reduced by the concentration in bulk as to justify its being carried to great distances and causing it to become a common and important article of commerce.

The cider thus condensed may be variously and beneficially used not applicable to common boiled cider.

First. It makes a most agreeable and healthy jelly (of twice the strength of ordinary jelly, and of course more nutritious) by dissolving sugar in it by heating the concentrated cider either in the vacuum-pan or in a bath of hot water. The jelly may be flavored with any desirable flavoring, and put into jars, cans, or other convenient vessels.

Second. It makes a cider for a beverage by dissolving it in water in proportions to the degree of concentration, or a little more or less, to suit the taste, letting it ferment, as desired for use, in the same way as other cider, it requiring some longer time for the process. The cider thus made is superior to that made from the same kind of apple in the ordinary way. By diluting and fermenting small portions of the concentrated cider at a time any family may supply itself with this beverage from day to day in the proper stage of fermentation at all seasons of the year and in any country.

I have discovered by several trials that by dissolving the concentrated cider in a little less water than was evaporated from it, and adding a little sugar or sirup, and letting it ferment and stand, (best in bottles,) a very good substitute for pure wine may be obtained, which cannot be done from apples in any other way with which I am acquainted.

Cider made from the concentrated article when properly fermented in casks may be transferred into bottles in the usual manner, and will, when ripe, be found better than cider made in any other way yet known.

It is evident that by a like process the juices of grapes, currants, and various other fruits may be concentrated so as to be prevented from fermenting until diluted with water to the proper degree, and I therefore wish to include all such juices of fruits within the scope of my patent.

Having thus explained my invention, I would state that I am aware that cider has been concentrated by evaporation in open air and used for various culinary purposes, and I therefore make no claim for evaporation of cider generally.

I am also aware that various fluid substances have been and are now concentrated in a vacuum under a low degree of heat, to prevent discoloration, scorching, or burning. I do not claim boiling cider and concentrating it in a vacuum for any such purpose; but I evaporate it out of contact with the air, to prevent the acidifying influence of oxygen and the hurtful change produced in boiling cider, as well as milk, when exposed to the atmosphere; but What I do claim as new, and desire to secure by Letters Patent, is—

1. As a new article of manufacture or merchandise, the juice of apples, grapes, currants, or any other fruits from which vinous liquors are or can be made so concentrated that it will be unaffected by the influence of external heat and moisture until properly diluted, the same being placed in casks or other suitable vessels, to permit it to be readily handled or transported, substantially as hereinbefore contemplated and described.

2. As a new article of manufacture or merchandise, sweet cider so concentrated that it will not be affected by external heat or moisture until properly diluted, the same being placed in casks or other suitable vessels to permit it to be readily handled and transported, substantially as hereinbefore described.

GAIL BORDEN, Jr.

Witnesses:
JOHN C. FOOTE,
JOHN M. BURR.